Figure 1:
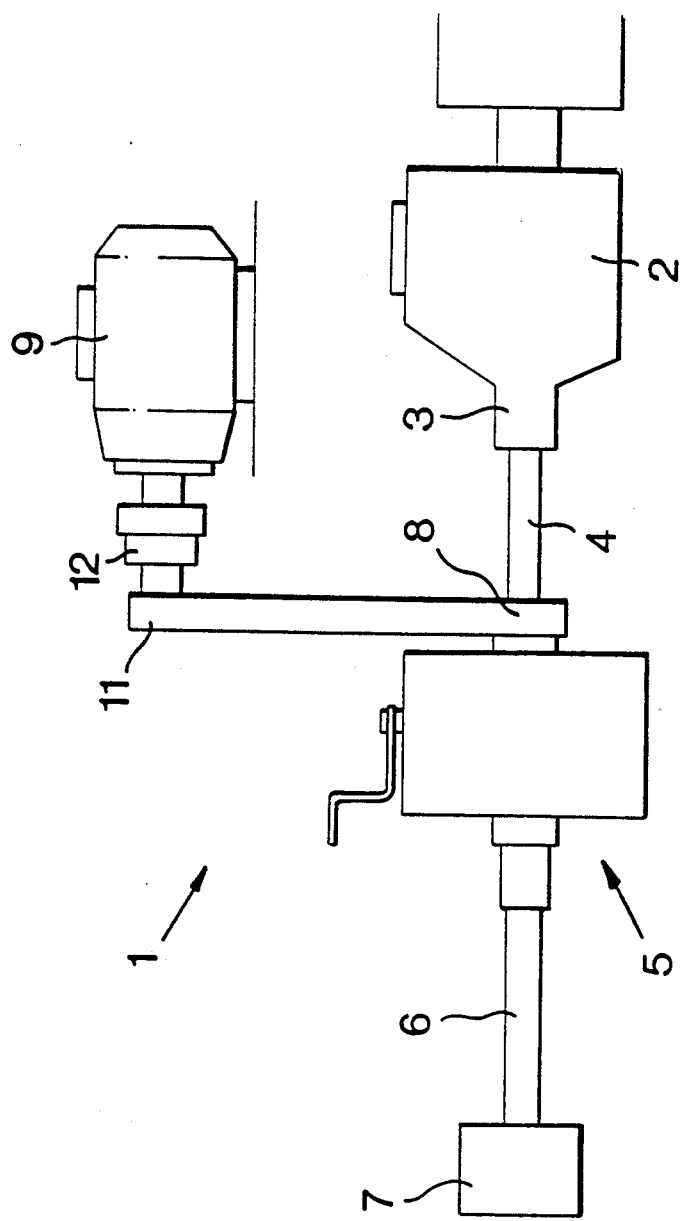

United States Patent [19]

Mirzakanien

[11] Patent Number: 4,966,243
[45] Date of Patent: Oct. 30, 1990

[54] POWER TAKE-OFF ARRANGEMENT

[76] Inventor: Hovsep J. Mirzakanien, 7 Adina Street, Seven Hills, NSW 2147, Australia

[21] Appl. No.: 258,851

[22] Filed: Oct. 17, 1988

[30] Foreign Application Priority Data

Oct. 15, 1987 [AU] Australia ................ PI4904

[51] Int. Cl.$^5$ .......................... B60K 17/28
[52] U.S. Cl. .................................. 180/53.1
[58] Field of Search ............ 180/53.1, 82, 53.62

[56] References Cited

U.S. PATENT DOCUMENTS

| | | | |
|---|---|---|---|
| 2,705,056 | 3/1955 | Bruins | 180/53.1 |
| 2,888,087 | 5/1959 | Duncan | 180/53.1 |
| 3,059,505 | 10/1962 | Reicks | 180/53.1 |

Primary Examiner—Richard A. Bertsch
Attorney, Agent, or Firm—Birch, Stewart, Kolasch & Birch

[57] ABSTRACT

The invention relates to a power take-off arrangement for use with motor vehicles. A power input shaft extends into a housing, and is drivingly connected to a motor vehicle engine and gearbox. A drive output shaft extends out of said housing and means are provided within said housing to drivingly connect or disconnect said power input shaft and said power output shaft. Said power output shaft is drivingly connected to the differential of the motor vehicle. The power input shaft mounts a sheave which is connected by means of flexible power transfer means, to a sheave and clutch of auxiliary equipment such as for example a pump. On drive connection means drivingly connecting said power input shaft and said power output shaft, and on the auxiliary equipment clutch being disengaged, the motor vehicle will be driven in a normal manner with the auxiliary equipment being in a non-operative mode. On the drive connection means being actuated to disengage said power inlet shaft and said power outlet shaft, and on said clutch associated with the auxiliary equipment being engaged, power from said power input shaft is imparted through said flexible power transfer means, to operate said auxiliary equipment.

3 Claims, 2 Drawing Sheets

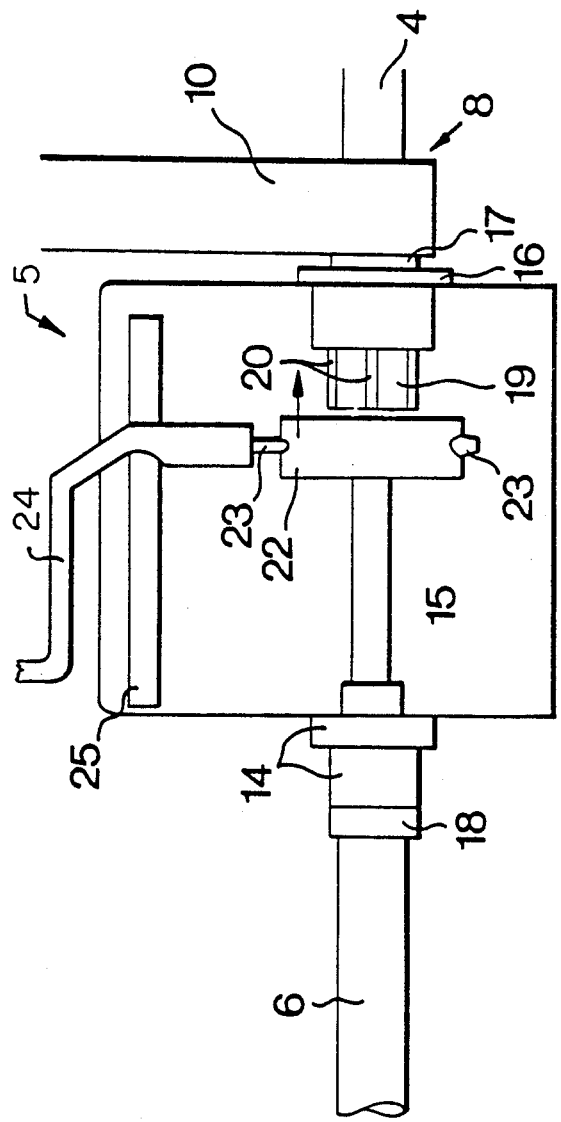
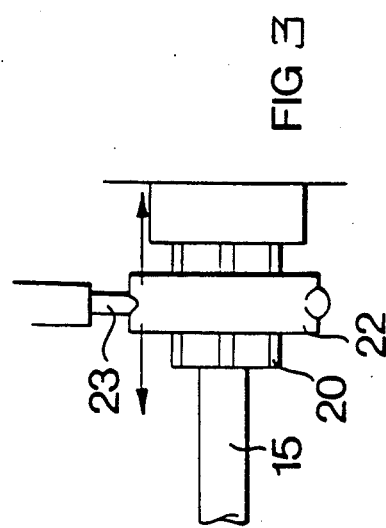

POWER TAKE-OFF ARRANGEMENT

BACKGROUND AND SUMMARY OF THE INVENTION

The present relates to a power take-off arrangement and in particular to a power take-off arrangement for use with motor vehicles.

It is well known to provide and use power take-off arrangements. Such arragements are, for example, known to be provided in association with many vehicles, including vehicles used in the agricultural industry, cartage industries, construction industries and the like. For example such power take-off arrangements are able to drive rotating drums on cement trucks, agricultural equipment on agricultural vehicles such as tractors and the like, and construction equipment on construction vehicles. Further, they may be used for driving auxiliary equipment attached to trucks and vans. These are however by way of example only.

It is an object of the present invention to overcome or minimize problems and complications that have arisen with power take-off arrangements used up until the present time.

Other objects of the present invention will become apparent from the following description.

According to one aspect of the present invention there is provided a motor vehicle power take-off arrangement comprising a power inlet shaft having power imparted thereto by a prime mover of said motor vehicle and a power outlet shaft drivingly connected to a differential of said motor vehicle. Power transfer means are provided for connecting said input shaft with auxiliary apparatus adapted to be selectively driven by said prime mover. The power input shaft and the power output shaft are spaced apart one from the other. Drive connection means are provided and adapted to be selectively actuable by an operator, such that in a first mode, said input shaft and output shaft are drivingly connected one with the other, and in a second mode said input shaft and output shaft are disconnected one from the other.

The present invention will now be described by way of example only and with reference to the accompanying drawings, wherein:

FIG. 1: is a schematic drawing of a motor vehicle drive assembly incorporating the power take-of arrangement of the present invention.

FIG. 2: is a schematic side view of a power take-off arrangement according to one form of the present invention.

FIG. 3: is a sectional view of the power take-off arrangement according to one form of the present invention.

In a preferred form of the present invention the power take-off arrangement is incorporated into a motor vehicle, such as for example a truck or a van. The invention will be described by way of example only, with reference to the power take-off arrangement being incorporated into such a vehicle, for the purpose of driving a pump or blower arrangement housed or mounted within the vehicle. For example for use in carpet cleaning, commercial cleaning and the like. It should be appreciate however, that this application is by way of example only and that the present invention can be mounted to any vehicle and used for driving any auxiliary apparatus.

Reference is first made to FIG. 1 of the accompanying drawings for illustrating a drive assembly of a motor vehicle. The drive assembly includes an engine 2 which drives a gearbox 3. A tail shaft 4 extends from the gearbox 3 and is, in a preferred form of the invention, separated or cut so that there is a spacing between the tail shaft 4 extending from the gearbox and the tail shaft 6 leading to the differential 7 of the motor vehicle. The power take-off arrangement of the present invention is located between the tail shaft 4 and tail shaft 6.

The tail shaft 4 extending from the gearbox 3 is connected to, mounted to or extends into, a drive input shaft 17 which leads into a power take-off housing 5. The power take-off housing 5 also mounts and locates a power output shaft 15 which is in turn mounted or connected to the tail shaft 6 leading to and connected to the motor vehicle differential 7.

The power input shaft 17 and power output shaft 15 are mounted in appropriate bearings 16, 14 and are generally elongate in formation, extending into the housing 5 and being mounted so as to be axially spaced apart, one from the other.

Adjacent end portions of the power input shaft 17 and power output shaft 15, within the housing 5, are formed or provided as splined portions, concentric formations or end portions 19, having outwardly extending and peripheral teeth or splined members 20. The splined portions 19 are substantially aligned one with the other. Suitably provided and mounted within the housing 5, is drive connection means 22, the drive connection means 22 being in the form of an internally splined or toothed sleeve, which is mounted over the splined portions 19, so that the teeth or splined member 20 of the splined portions 19 engage and mesh with the teeth or splined members on the internal surface of the drive connection means 22. The drive connection means 22 is longitudinally movable relative to and between the splined end portions 19 of the input shaft 17 and output shaft 15.

The drive connection means is mounted to or provided with a handle or yoke 23, which is movable axially by an operating lever 24, for example pivotally supported by a shaft 25. Operation thereof will allow the drive connection means 22 to move longitudinally between a first position (as shown by way of example only in FIG. 2 of the drawings), in which the drive connection means 22 covers the splined portion 19 of the drive output shaft, thus disconnecting the drive input shaft 17 from the drive output shaft 15.

Referring to FIG. 3 of the accompanying drawings it will be seen that the drive connection means 22 is axially movable to that the drive connection means 22 can bridge and thus connect the splined portions 19 of the input shaft 17 and output shaft 15.

It should be appreciated that various means of operating and moving the drive connection means 21 can be utilised to advantage. The operating means referred to above are by way of example only and other appropriate operating means such as for example electrical control means, hydraulics and the like can be utilised.

Referring further to the accompanying drawings, the power input shaft 17 is provided with a pulley or sheave 8, so that rotation of the power input shaft 17 will cause said pulley or sheave 8 to rotate. A further pulley or sheave 11 is also provided or an auxiliary piece of equipment, such as for example, a pump 9. An elongate and flexible power transfer means, such as for example an elongate flexible belt, passes about and the extends between the pulleys 8 and 11.

Suitable known clutch means can be provided in association with the auxiliary equipment such as the pump 9, such that on actuation of the clutch 9 power imparted from the pulleys or sheaves 8 and 11, and the flexible drive belt 10, will be imparted to the auxiliary equipment so as to operate the same. As will be appreciated, send the sheave or pulley 8 is mounted to the power input shaft 17, the pulley or sheave 8 will always rotate therewith as will the pulley or sheave 11 when connected by a flexible drive means or belt 10. The clutch means 12 are therefore provided, so as to allow for the pump to be engaged or disengaged with or from power being imparted from the power input shaft.

Referring further to the accompanying drawings, when it is desired to operate the motor vehicle in a normal manner, and to have power imparted from the engine 2 and gearbox 3, to the differential 7, the drive connection means 22 is operated so that it moves longitudinally between the splined portions 19, so that it bridges the splined portions 19 and drivingly connects the power input shaft 17 and power output shaft 15. During such operation power will also be imparted to the driven pulley 11, and if desired the auxiliary equipment could also be actuated during normal vehicle operation, by engagement of the clutch 12.

When it is desired to operate only the auxiliary equipment in the form of the pump 9, the drive connection means 22 is again moved axially, away from the splined portion 19 of the power input shaft 17 so that the splined portions 19 of the input shaft 17 and output shaft 15 are disconnected one from the other, thus axially spacing the power input shaft and power ouptput shaft one from the other. In this position, the motor and gearbox of the motor vehicle can be utilised to drive the power input shaft, which will cause the pulley 8 to rotate, thus imparting power to the pulley 11 through the belt 10. On actuation of the clutch 12 the pump 9 or other auxiliary equipment will be actuated and will be driven from the motor vehicle engine and gearbox, without normal motor vehicle operation.

The invention has been described by way of example only with reference to the auxiliary equipment being in the form of a pump, but is should be appreciated that this is by way of example only and that other forms of auxiliary equipment can be utilised to equal advantage. For example farm equipment, construction equipment, cleaning equipment and the like.

It should be appreciated that the invention has been described by way of example only and that improvements and modifications may be made thereto without departing from the scope or spirit thereof.

I claim:

1. A motor vehicle power take-off arrangement comprising:
   a power take-off housing,
   a power inlet shaft having power imparted thereto by a prime mover of the motor vehicle and a power outlet shaft drivingly connected to a differential of said motor vehicle, said power inlet shaft and said power outlet shaft coaxially extending into said power housing and having their free ends spaced apart from each other, said free ends having identical, externally-splined portions,
   a drive connector means disposed within said power take-off housing, said drive connection means comprising an axially slidable collet having mounted therein a rotatable co-acting internally-splined sleeve, said collet being able to be selectively actuated by an operator so that, in a first position in which said collet bridges, and meshes with, both the said externally-splined end portions, said input and output shafts are drivingly connected and, in a second position in which said collect meshes only with one externally-splined end portion, said input and output shafts are disconnected, one from the other;
   and means for transmitting power from said power input shaft to thereby drive auxiliary equipment.

2. The arrangement as claimed in claim 1, wherein said power input shaft is provided with a first sheave; a second sheave is connected to said auxiliary apparatus; an elongate flexible element extends between said first and second sheaves so that the drive from said input shaft is imparted to the sheave of said auxiliary apparatus; and a clutch means is provided in association with said auxiliary apparatus, whereby said auxiliary apparatus is selectively driven by and from second sheave.

3. The arrangement as claimed in claim 1, wherein said power output shaft is drivingly connected to a motor vehicle tail shaft which is, in turn, drivingly connected to a motor vehicle differential; said power input shaft being drivingly connected to a motor vehicle engine and gearbox such that power and gearing is imparted to said sheave associated with said auxiliary apparatus.

* * * * *